(12) United States Patent
Sanders et al.

(10) Patent No.: US 8,117,127 B1
(45) Date of Patent: Feb. 14, 2012

(54) CURRENCY RECYCLER USER ROLES

(75) Inventors: William Thomas Sanders, Denver, NC (US); Daniel Christopher Bohen, Charlotte, NC (US); Shane Anthony Johnson, Charlotte, NC (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 468 days.

(21) Appl. No.: 12/323,078

(22) Filed: Nov. 25, 2008

(51) Int. Cl.
*G06Q 40/00* (2006.01)

(52) U.S. Cl. .......................................... 705/43; 705/30

(58) Field of Classification Search ............... 705/10–44
See application file for complete search history.

(56) References Cited

U.S. PATENT DOCUMENTS

| | | | | |
|---|---|---|---|---|
| 4,570,223 A * | 2/1986 | Yoshimoto | ...................... | 705/18 |
| 6,067,124 A * | 5/2000 | Shirahama et al. | ........... | 348/581 |
| 6,607,530 B1 * | 8/2003 | Carl et al. | ...................... | 606/914 |
| 6,883,709 B2 * | 4/2005 | Joseph | ........................... | 235/381 |
| 7,073,707 B2 * | 7/2006 | Carter | ........................... | 235/7 R |
| 7,542,945 B2 * | 6/2009 | Thompson et al. | ............. | 705/64 |
| 7,635,085 B2 * | 12/2009 | Brown et al. | .................. | 235/379 |
| 7,822,684 B2 * | 10/2010 | Rielly et al. | .................... | 705/43 |
| 2002/0169673 A1 * | 11/2002 | Prorock et al. | .................. | 705/16 |
| 2006/0253332 A1 * | 11/2006 | Dobbins | ........................ | 705/21 |

* cited by examiner

*Primary Examiner* — Frantzy Poinvil
(74) *Attorney, Agent, or Firm* — Banner & Witcoff, Ltd.; Michael A. Springs

(57) ABSTRACT

A currency handling system, for example, a currency recycler, may be configured to receive and process currency transactions entered by different recycler users. The currency recycler may identify and/or authenticate the user attempting to perform a transaction, for example, cash withdrawals, deposits, exchanges, or administrative and other functions. Once the user has been identified, the currency recycler may identify one or more user roles associated with the user, and corresponding user thresholds and/or role thresholds which may define a set of functional limitations for the user on the recycler. The recycler may then process the user's transaction request in accordance with the applicable thresholds based on the user and user roles.

25 Claims, 9 Drawing Sheets

| User Role | Withdrawal Trans. Limit | Withdrawal Daily Limit | POS – Replenishment | Times Active |
|---|---|---|---|---|
| Junior Cashier | $150 | $300 | N | 9am – 10pm |
| Senior Cashier | $200 | $500 | Y | 9am – 10:30pm |
| Store Manager | $1000 | $2500 | Y | 8am – 11pm |
| Recycler Administrator | $300 | $2000 | Y | 9am – 10:30pm |
| System Administrator | $0 | $0 | N | 9am – 5pm |
| Drivers (CUSTOM) | $50 | $50 | N | 2pm – 10:30pm |
| ... | | ... | | |

FIG. 6A

| User ID | Employee Name | User Roles | ... |
|---|---|---|---|
| 0334 | Employee ABC | Senior Cashier | |
| 0178 | Manager DEF | Recycler Administrator, Store Manager | |
| 0459 | Contractor XYZ | Junior Cashier, Driver | |
| ... | | | |

FIG. 6B

| User ID | User Threshold | Threshold Value |
|---|---|---|
| 0334 | Withdrawal Daily Limit | $1500 |
| 0178 | Times Active | 12pm – 4pm |
| 0178 | Create Custom Thresholds | Y |
| 0459 | Safe Fund Exchanges Allowed | N |
| ... | | |

FIG. 6C

STORE ABC – CURRENCY RECYCLER

Login To Perform Transaction:

Username: cashier0365 — 802a

Password: ************ — 804a

[LOGIN]  [CANCEL]

STORE ABC – CURRENCY RECYCLER

Welcome, cashier0365.

Please choose an action from the options below:

| | Reg. # | Amount | |
|---|---|---|---|
| 802b — 1. Point of Sale Withdrawal | ☐ | $ | [GO] |
| 804b — 2. Point of Sale Deposit | ☐ | $ | [GO] |
| 806b — 3. Safe Funds Withdrawal | | $ | [GO] |
| 808b — 4. Safe Funds Deposit | | $ | [GO] |
| 810b — 5. Manage Recycler | | | [GO] |

[LOGOUT]

CURRENCY RECYCLER USER ROLES

FIELD OF THE INVENTION

Aspects of the disclosure relate to cash handling in a cash-centric environment. More specifically, aspects of the invention relate to receiving and processing transaction requests at a currency handling device based on the identity of the requesting user and user roles associated with that user, in accordance with functional limitations on the device designated for different users and user roles.

BACKGROUND

Cash flow refers to the movement of cash and/or other currencies over a particular time period within a business or enterprise. Business personnel in charge of cash flow management may use various tools to assist in the cash flow process, including cash handling devices, which may include cash recyclers, depository and/or dispensing machines that allow a retail establishment to maintain and re-use an amount of cash on-site. Currency recycler devices, or cash recyclers, may interact with multiple different users acting in different capacities within the business, for example, cashiers temporarily transferring cash to and from points of sale (e.g., cash registers) operating at a store, or employees exchange cash into different denominations, and managers making various withdrawals and deposits in the course of business operations. Cash recyclers may be configured to process currency transactions, accept cash deposits and dispense cash withdrawals, and calculate and manage use of cash flows in real-time.

Cash handling devices, such as cash recyclers, are being used in more locations (e.g., retails establishments, etc.) and are being used by many different types of users at these locations (e.g., managers, customer service personnel, point of sale cashiers, recycler administrators, etc.). For example, a store may have dozens of employees, contractors, and/or vendors having different jobs and responsibilities, many of whom may have reason to interact with the store's recycler to perform various cash-related transactions. However, it might be impossible or undesirable to provide unlimited and unrestricted access to the cash recycler for all of these employees. For example, security concerns, difficulties of employee training, and inefficiency of recycler transactions may make it advantageous for the store to implement different functional limitations for some or all of these users. However, it may be quite tedious to assign different sets of functions, privileges, and limitations to each user individually. Accordingly, there is a need for additional flexibility and efficiently in the configuration of cash handling devices to provide functional limitations on transactions to different users.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, currency handling methods, systems, and apparatus are provided to a cash-centric business or enterprise. In various embodiments, a currency handling apparatus (e.g., currency recycler) may receive and process currency transactions based on input received from users and based on a set of function limitations (i.e., thresholds) defined for the apparatus. For example, a user may input via a user interface of a recycler identification information allowing the apparatus to authenticate the user. Once the user has been identified, the apparatus may retrieve one or more user roles associated with the user, and a set of thresholds defined for the user and/or for any associated user roles. The transaction requested by the user may then be processed in accordance with the user's information and associated thresholds, so that the recycler may be configured to permit, limit, or restrict certain transactions for certain users (and user roles). Illustrative examples include thresholds based the type of transaction the user performs, limits on the amounts of the user's currency transactions, time restrictions, as well as thresholds based on different combinations of these criteria and other functional restrictions limiting the use of the currency handling apparatus based on the user and/or user role.

According to another aspect, the currency handling system, for example, a currency recycler, may provide a user interface configured to receive input identifying one or more users and storing associations defining the users as members of one or more user roles. In certain embodiments, a currency recycler user interface may permit users to create new thresholds, remove thresholds, modify existing thresholds, and designate thresholds for individual users and user roles, so that the thresholds will apply to subsequent transactions performed by one of the users associated with the user role. According to other aspects, users may be associated with multiple different user roles, and relationships may be established between roles (e.g., parent-child).

BRIEF DESCRIPTION OF THE DRAWINGS

The present disclosure is illustrated by way of example and not limited in the accompanying figures in which like reference numerals indicate similar elements.

FIGS. 6A-6C illustrate sample database tables storing records relating to users, user roles, and thresholds, in accordance with aspects of the invention.

FIGS. 8A-8C illustrate example user interfaces for receiving user transaction requests and processing the requests based on user and user role threshold information, in accordance with aspects of the invention.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), cash dispensing machines, cash depository machines, currency recyclers and the like. Currency recyclers generally refer to cash handling devices that are configured to dispense the same currency that was earlier deposited. For example, if a user deposits a five-dollar bill into a cash recycler machine, the same five-dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
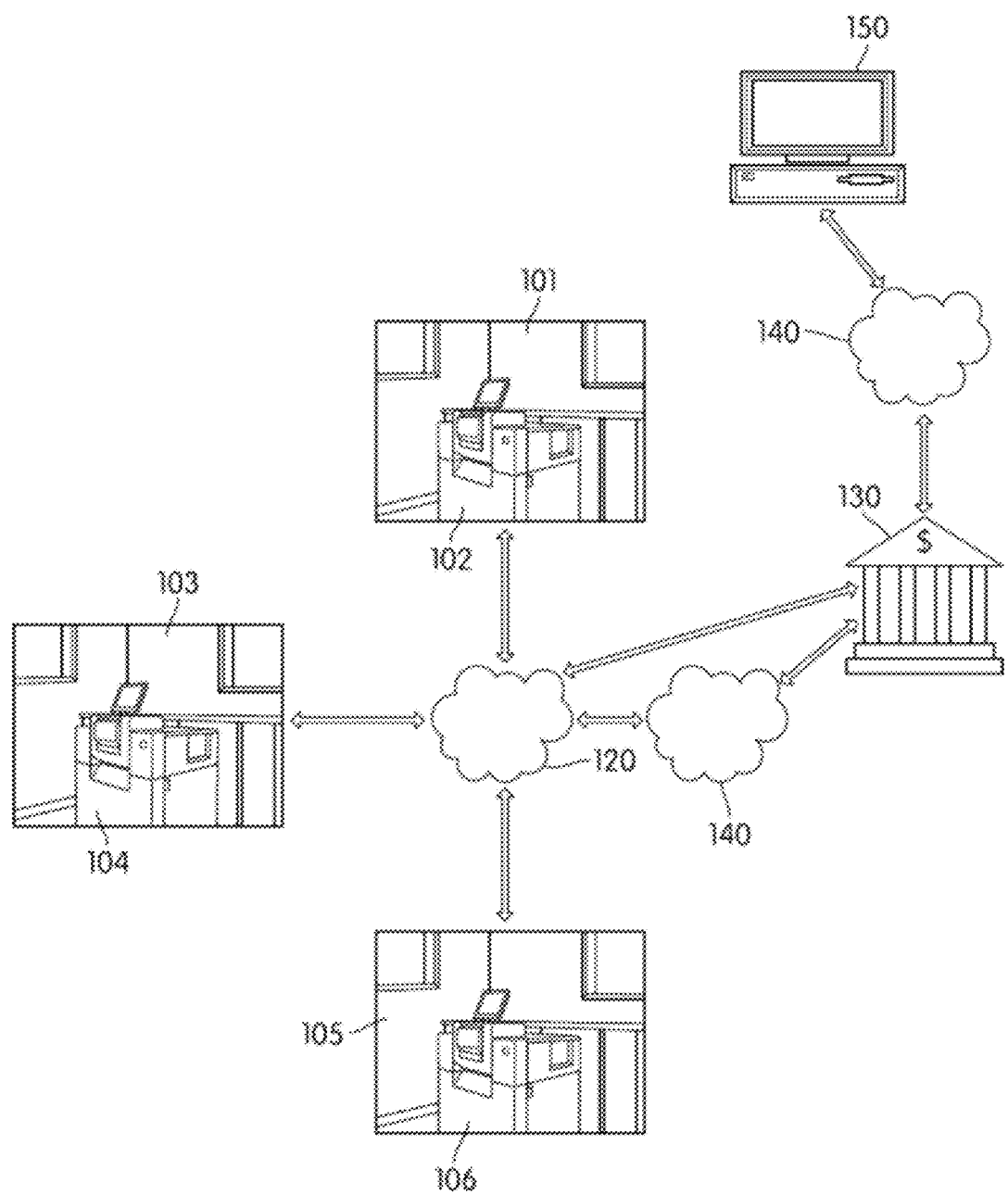
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
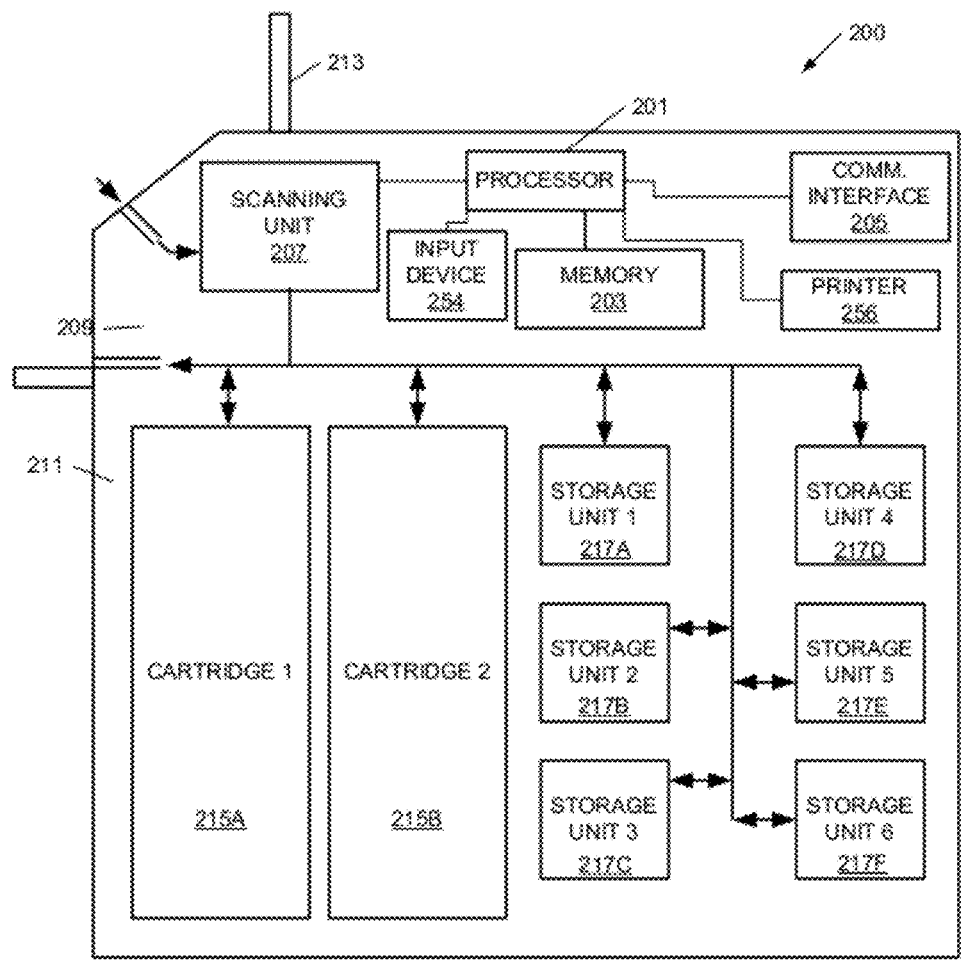
FIG. 2 illustrates a simplified diagram of a currency recycler in accordance with aspects of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and storage units 217 (e.g., stackers or Rolled Storage Modules (RSMs)). Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or more printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
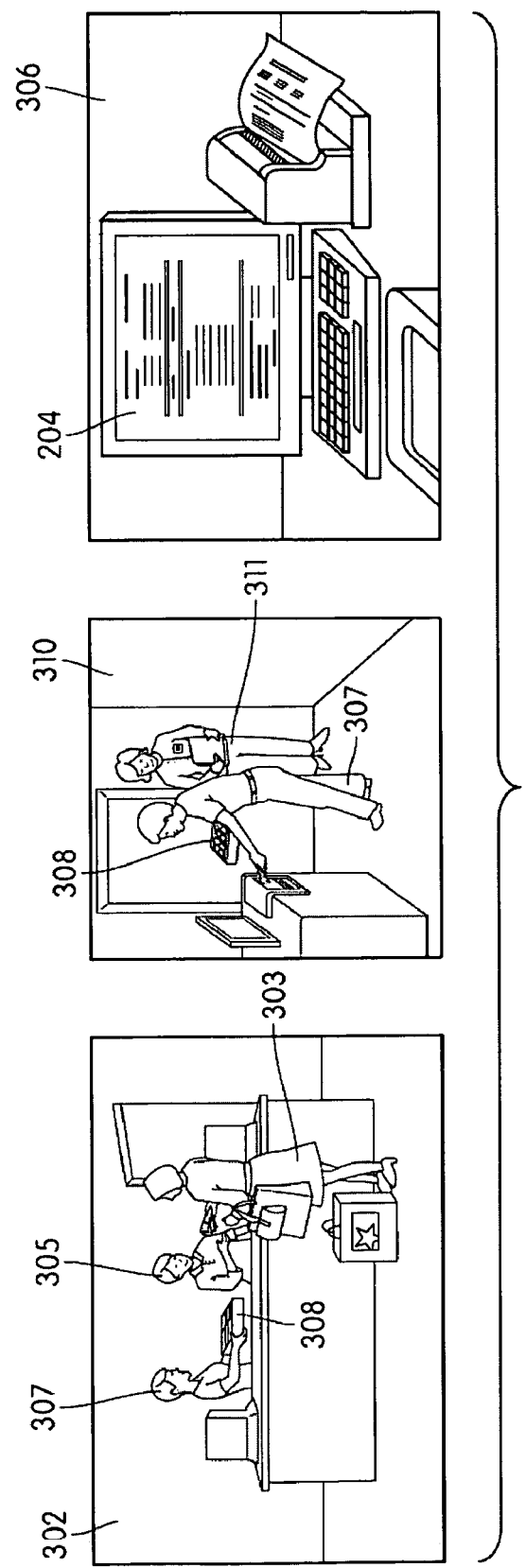
FIG. 3 illustrates various features of a currency recycler that may be used in accordance with aspects of the present invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
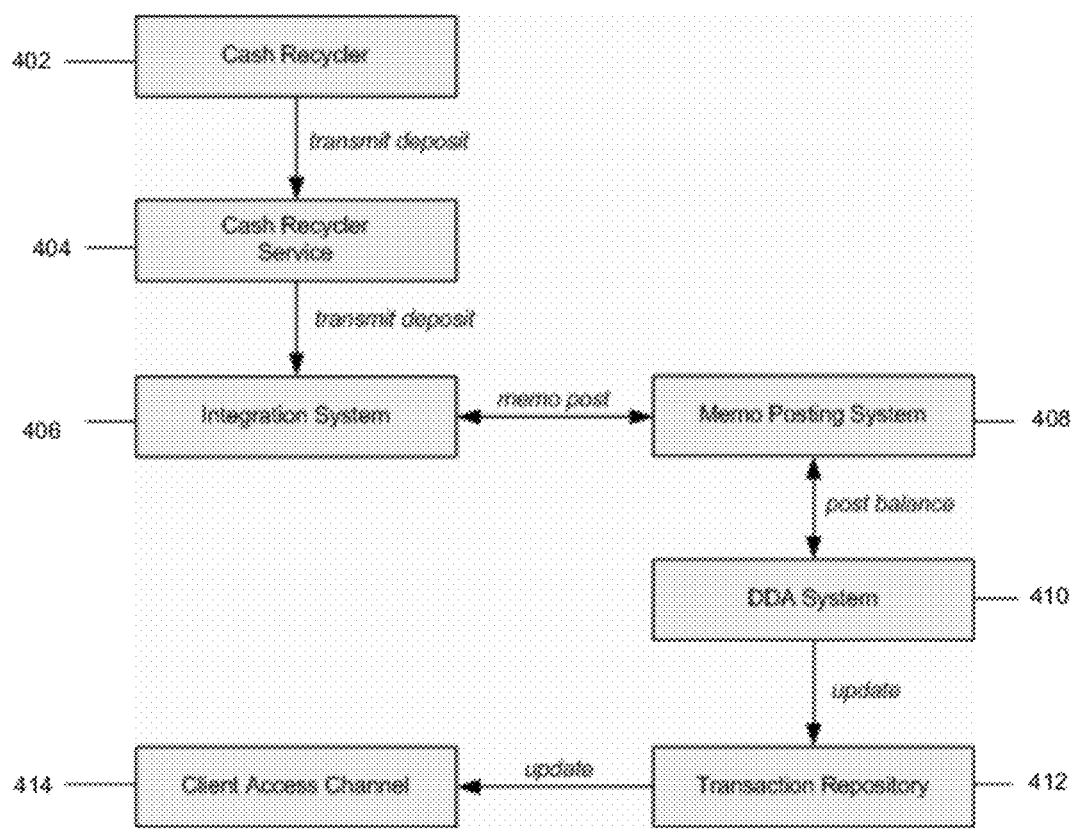
FIG. 4 illustrates a system configuration that may be used in accordance with aspects of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
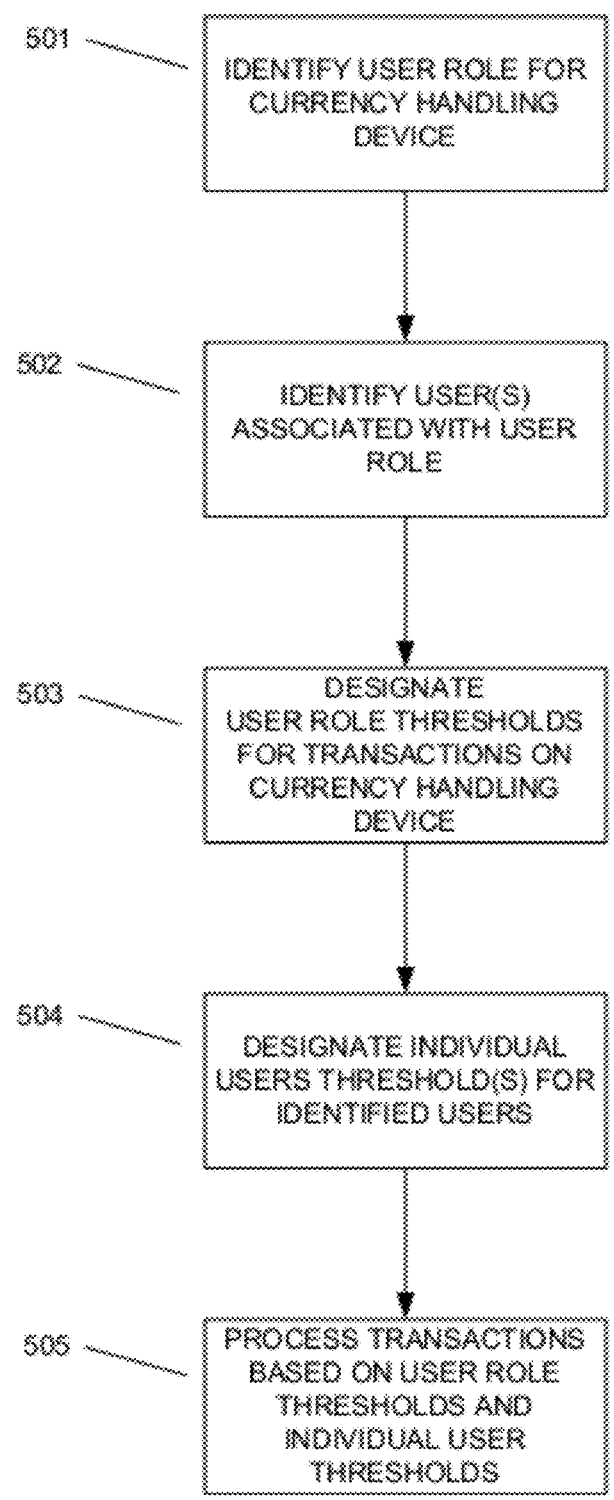
FIG. 5 illustrates a method for defining user role thresholds and individual user thresholds at a currency handling device, in accordance with aspects of the invention.

FIG. 5 is an illustrative flow diagram outlining steps for defining user role thresholds and individual user thresholds at a currency handling device (e.g., currency recycler 200), so that those thresholds may be applied when processing transaction requests from users. Specifically, as described below, the recycler 200 may be configured to associate the recycler users with various user roles to limit the functionality of the recycler 200 for the users within those roles. Individual users privileges/limitations on the recycler 200 may be further customized in addition to (or overriding) a user's role designations. As discussed above, these illustrative steps may apply to many different currency handling and servicing apparatus that are set up in cash-flow retail establishments (e.g., department stores, grocery stores), to process currency transactions from different users (e.g., cashiers, managers) of the apparatus.

In step 501, a user role is identified at the currency recycler 200. A user role may be defined as a classification relating to a common status or position that is applied to one or more users of the currency recycler 200. For example, user roles may correspond to job titles at a retail establishment (e.g., Cashier, Manager, or Administrator). In this example, each employee of the retail establishment may be categorized into one (or more) of these three user roles, so that users may be given different access privileges and/or functional limitation at the currency recycler 200 based on their respective roles. This example may apply to department stores and/or grocery stores, while different sets of user roles may be more appropriate for other types of establishments (e.g., restaurants, gas stations, movie theaters, and different types of venues). Another illustrative set of user roles is shown in the Roles-Thresholds table 600a in FIG. 6A. The set of user roles in this example includes several predefined roles and one custom user role ('Drivers'). In certain embodiments, a default set of user roles (e.g., Cashier, Manager, or Administrator) may be predefined by the currency recycler 200, while the retail establishment may be permitted to remove any inapplicable default roles and/or to add new custom roles based on the logical and appropriate user classifications at their establishment. In these examples, the permissions to add/remove user roles from the recycler 200 may be limited to managers or members of special designated role (e.g., system administrators) that cannot be removed from the recycler 200.

Identifying a user role in step 501 may comprise displaying a user interface having a list of the user roles of the recycler 200, and then receiving user input from a user of the recycler 200 (or operator) selecting one of the user roles. For instance, the recycler 200 may display a scrollable list of all valid user roles on the display screen 213, and then may allow the user to select any of the displayed roles via input device(s) 254 to begin the process of modifying/configuring the selected role.

In step 502, one or more users of the currency recycler 200 are identified as being associated with the user role. To implement step 502, a user interface may be provided which is similar (or the same) as the user interface of step 501 used to identify a user role. For example, a user interface may be displayed on the display screen 213 presenting a user with a drop down list of the current user roles on the recycler 200 and allowing the user to select a role (step 501). After the operator has selected a user role from the list, the user interface may then be updated to allow the operator to view, add, or remove user names from the selected role in step 502 (e.g., by selecting user names from a list, dragging and dropping users into a user role screen region, or any of several other well known user interface techniques that may be used to associate user names with the selected user role).

Referring briefly to FIG. 6B, the illustrative 'Users' database table 600b is shown storing a list of users and their associated user roles. As table 600b indicates, a single user (e.g., Manager DEF) may be associated with multiple different user roles. In certain examples, users need not be associated with any user role. In other examples, a more strict framework may be implemented that requires every user to be associated with exactly one user role. For instance, a currency recycler 200 at a department store may be configured so that only a predetermined set of user roles are defined (e.g., a cashiers role, managers role, and administrators role), and that every user must be a member of one of these predefined roles.

In step 503, one or more thresholds are created and/or designated for the user role. A threshold may be defined as a limitation on the transactions that may be performed at the currency recycler 200 by a set of users. For example, user role thresholds that are designated at the currency recycler 200 may define the functional restrictions on the types of recycler transactions that the users within the user role are permitted to perform. For instance, a Cashiers role at a retail store may be assigned a threshold corresponding to a $200 daily withdrawal limit, meaning that each store employee who has been designated as a member of the Cashiers role may withdraw a maximum of $200 from the store's currency recycler 200 in a single day. In contrast, the manager role at this store may be assigned a $1,000 daily withdrawal threshold, meaning that each of the store's managers (by default) are permitted to withdraw up to $1,000 each day.

Referring again to FIG. 6A, the sample 'Role-Threshold' database table 600a is shown including a user role column followed by four columns corresponding to illustrative user role thresholds. As shown in each column of the Role-Threshold table 600a, the threshold values may depend on the type of the threshold (e.g., time ranges, monetary values, Booleans, etc.) and the values themselves may be different for the different user roles. It should be understood that the Role-Threshold table 600a is illustrative and contains only a few of the many possible types of thresholds. For example, thresholds may restrict the type of transactions that users may perform at a currency recycler 200. According to certain aspects, the transactions supported by a recycler 200 may be classified into different types, such as, for example, point of sale (POS) transactions corresponding to a withdraw/deposit/exchange of funds from a specific point of sale (e.g., register) within a retail establishment, and safe funds transactions that do correspond to any specific point of sale but may be viewed conceptually as a cash transaction between a user and the currency recycler 200 only. Administrative functions on the currency recycler 200 (e.g., adding and removing users, installing software and peripheral devices, etc.) may also be classified as a transaction type, as described further below.

Thus, for transaction types, a user role threshold may be defined indicating that users within that role are permitted to perform certain types transactions on the recycler 200 (e.g., point of sale deposits), but are not permitted to perform certain other transaction types (e.g., safe funds withdrawals or exchanges).

Other user role thresholds defined in step 503 may relate to cash limits for withdrawals and other transactions at the currency recycler 200. For instance, as in the earlier example, users in a Cashiers role may be designated a lower daily withdrawal limit than users in a manager role. In other examples, a user role may be designated with per transaction maximum (or minimum) amounts (e.g., $100 maximum per withdrawal, $50 maximum currency exchanges, $500 minimum per deposit). As yet another example, a user role may have threshold defining its replenishment permissions at points of sale in the store. In this example, certain user roles (e.g., junior cashiers) might only be authorized to withdraw cash from the recycler 200 once at the beginning of the day to stock their registers, while other user roles (e.g., senior cashiers, managers) may be permitted to replenish registers as needed by making multiple withdrawals throughout the day from the currency recycler 200. Thus, a replenishment threshold may be a simple Boolean value, or a number corresponding to the number of replenishment transactions the a user will be permitted over a period of time.

User role thresholds may also relate to time restrictions on the operation of the currency recycler 200. For example, a user role may designate a certain time window during which the users within the role are allowed to perform recycler transactions. For instance, as shown in the example of the Roles-Thresholds table 600a, the Junior Cashier user role is permitted to access (i.e., log in and/or perform transactions) the currency recycler 200 from 9:00 am to 10:00 pm, while store managers have a larger designated time threshold of 8:00 am to 11:00 pm. Although not shown in this example, time thresholds may also include days (e.g., days of the week, specific dates throughout the year) during which users in a user role are granted or denied certain privileges on the recycler. Other similar thresholds may define date/time windows during which users are limited to performing certain transactions on the recycler 200.

In other examples, different threshold criteria (e.g., transaction type, currency amounts, times, etc.) may be combined into 'compound' thresholds. For instance, a user role threshold may indicate that users of that role are not permitted to perform a specific transaction (e.g., a safe funds withdrawal), for more than a specific amount (e.g., $500), during a specific time window (e.g., 10 pm-6 am). In this example, because a compound threshold is used (i.e., a threshold combining two or more criteria), the users in the affected role would not be prevented from making point of sale (POS) withdrawals from the recycler 200 for greater than $500 during the specified time, or making safe funds withdraws for less than $500 during the specified time window, etc. As another example, a first threshold on the cashiers role may set a daily point of sale (POS) withdrawal limit for store cashiers, however, a second threshold on the cashiers role may raise this POS withdrawal limit for a predetermined set of high volume shopping days (e.g., national holidays, the day after Thanksgiving, etc.). In certain examples, user thresholds and/or user role thresholds may also be overridden by manager authority. Additional details regarding the resolution and processing of multiple related (and/or conflicting) thresholds are described below in reference to FIG. 7.

The above examples involving compound thresholds and multiple related thresholds may involve greater complexity in order to store and process the thresholds compared to the more simple examples shown in tables 600a-600c. However, the same well known principles of database design and data storage and retrieval may be used to store and process even highly complex types of thresholds. Additionally, a similar (or the same) user interface used in steps 501-502 may also be used to create thresholds and/or designate the relationships thresholds and user roles in step 503. For example, after a user has identified a user role via the display user interface on the recycler 200, the display screen 213 may be updated to provide a list of possible thresholds that may be applied to the selected user roles, along with the necessary user interface components (e.g., text areas for time or amount values, check boxes for defining restrictions on transaction types, etc.), so that the operator may designate thresholds for the user role (or create/modify new thresholds), and input the threshold values that will define the precise functional limitations that will be applied by the recycler 200.

In step 504, one or more thresholds may be designated for individual users of the currency recycler 200. These user thresholds, in contrast to the user role thresholds described above, may apply to an individual user without applying to other users sharing that user's same user role(s). Thus, it may be possible to override user role thresholds by applying exceptions for specific users. As an example, a retail store may designate a Cashiers role with withdrawal privileges from the currency recycler 200 between the hours of 10:00 am and 6:00 pm. However, the store may need an individual cashier to work until 9:00 pm, and may designate a user threshold to extend the time window for that cashier. In this example, applying an individual user threshold may have potential advantages over other possible solutions. For instance, another solution may be to remove this cashier from the cashiers role altogether. However, a separate user time threshold may be preferable in this instance so that all of the other thresholds defined on the cashiers role will continue to apply to the late-working cashier.

In certain embodiments, any of the possible user role thresholds described above in step 503 may be designated for individual users in step 504. Thus, the functional limitations of users on the currency recycler 200 may be set by a combination of user role thresholds and (overriding) individual user thresholds. In other examples, only a subset of the user role thresholds supported by the recycler 200 might be available as individual user thresholds. It should also be noted that step 504 may be optional in certain examples. That is, if the set of user roles provided by the currency recycler 200, and the respective user role thresholds and threshold values are sufficient to provide appropriate limitations for all users (based on the needs of the retail establishment), then individual user thresholds might not be needed on the recycler 200 in some examples. Furthermore, as noted above, not every individual user must be associated with a user role on the recycler 200. Thus, step 503 may also be optional in certain examples. In this case, recycler users not associated with any role may have all of their functional limitations on the recycler 200 defined by the individual user thresholds designated in step 504.

Referring briefly to FIG. 6C, the illustrative 'User-Threshold' database table 600c is shown storing a set of sample user thresholds. In this example, each user in table 600c already has one or more designated user roles (see table 600b). Thus, the individual user thresholds in table 600c may be used to modify or remove (i.e., override) the limitations defined by the user role thresholds, or may add further limitations for specific users. Additionally, as in steps 501-503, a similar (or the same) user interface may be used to designate individual user thresholds in step 504. For example, after a user at the recycler 200 has identified a user role, associated users with the user role, and designated thresholds for the user role via the display user interface, the display screen 213 may be updated to support creation of individual user thresholds.

According to other aspects, one or more of the recycler functions described above in steps 501-504 may be limited to certain recycler users such as store managers, recyclers administrators, etc. For example, a retail store may decide that not every employee should have the ability to create new user accounts, assign users to different user roles, and add/remove/modify the thresholds that are associated with different users and/or user roles. These and other administrative functions on the current recycler 200 may be restricted using the same framework described above by assigning user roles, setting user thresholds and user role thresholds, etc. In this example, the different administrative functions on the recycler 200 (e.g., create new user, remove existing user, assign user to role, remove user from user role, create custom user roles, create/remove/modify thresholds, assign thresholds to users or user roles, etc.), may be classified as transaction types. Thus a similar user, role, and threshold framework may be used to limit access to these functions to certain users, groups, times of day, and based on any other criteria stored within the recycler 200.

It should also be understood that although the illustrative example of FIG. 5 shows steps 501-504 happening in that order, in other examples these steps may occur in any other order. For example, a user interface at the recycler 200 may first provide a menu to create a custom threshold (step 504), and then a separate menu to apply the new threshold to selected users (step 501) and/or user roles (step 503). As another example, the recycler user interface may first provide a menu allowing an operators to select a user name from a list (step 502), and then after the user is selected, the user interface may be modified to allow an operator to add or remove the user from a user role (step 501), and/or to create or delete the associations between the user and the thresholds on the recycler 200 (step 504). Similarly, it should be understood that any of the steps 501-504 may be optional in certain examples, depending on the type of transaction (user management, threshold creation, threshold assignment, etc.) being performed at the recycler 200. In other examples, any of the steps 501-504 may be performed multiple times, either in sequence or at separate times, while configuring the recycler 200. For example, when selecting a user to be associated with a role or a threshold (or vice versa), the recycler user interface may provide a selection menu that allows for designation of multiple users into a user role at the same time. Additionally, when assigning a threshold to a user role on the recycler 200, the user interface may support multiple threshold assignments without requiring the user to return to a home menu screen.

In step 505, transactions at the currency recycler 200 may be processed in accordance with the user role thresholds and individual user thresholds defined in steps 501-504. As described below, certain techniques for processing recycler transactions may include first identifying the user roles and thresholds associated with a user performing the transaction, and then comparing the applicable thresholds to the requested transaction. The processing of transactions based on user role thresholds and individual user thresholds is described in greater detail in reference to FIG. 7.

Referring again to the illustrative database tables 600a-600c in FIGS. 6A-6C, it should be understood that these tables show one of many possible techniques for storing data and relationships between users, roles, and thresholds. Specifically, in this example, the Role-Threshold table 600a stores a sample list of user roles on a currency recycler 200, along with a sample list of thresholds and threshold values associated with each user role. Users table 600b is an illustrative table storing a list of users on the currency recycler 200, along with the associations between the users and the user roles shown in table 600a. The Users-Thresholds table 600c is another illustrative table storing a list of users and the individual user thresholds assigned to those users. Sample database tables 600a-600c are merely illustrative of some of the examples described herein. In other examples, a recycler database may comprise a more complex structure with multiple referenced tables and several additional data fields not shown in this example. Additionally, as is well known in the art, many other possible arrangements for storing user, user role, threshold, and transaction data may be used (e.g., remote or local storage, spreadsheets, data files, etc.).

Figure 7:
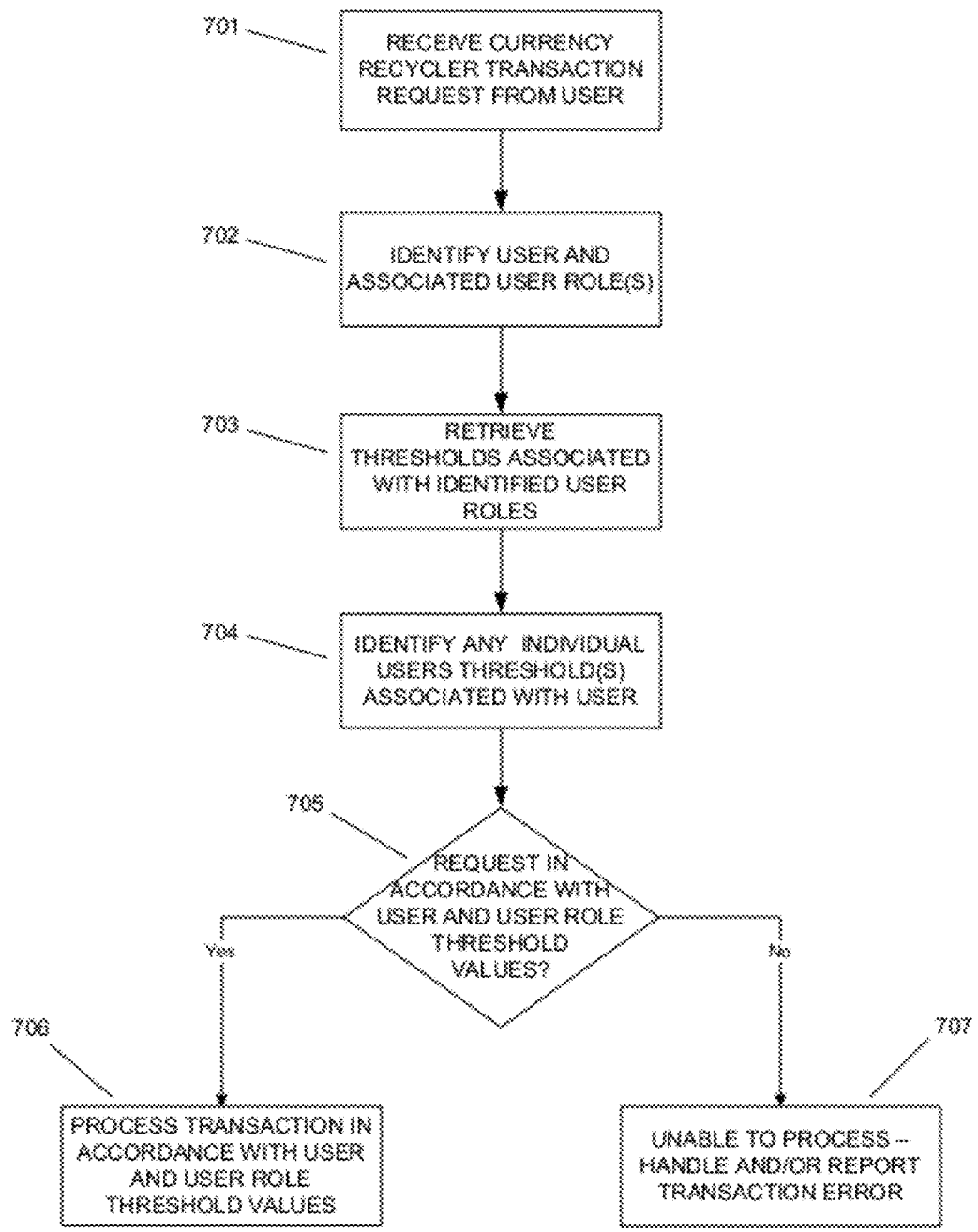
FIG. 7 illustrates a method for receiving user transaction requests at a currency handling device and processing the transaction requests based on user and user role threshold information, in accordance with aspects of the invention.

FIG. 7 is an illustrative flow diagram outlining steps for processing transaction requests at a currency handling device (e.g., currency recycler 200) based on user roles and/or thresholds. As described below in detail, the recycler 200 may first identify a user requesting a transaction, determine any functional limitations (e.g., thresholds) on the operation of the recycler 200 that may apply to the user, and then perform (or reject) the transaction in accordance with the thresholds associated with the user. The steps in this example may also apply to different currency handling and servicing apparatus that are set up in cash-flow retail establishments (e.g., department stores, grocery stores), to process currency transactions from different users (e.g., cashiers, managers) of the apparatus.

In step 701, a transaction request is received at a currency recycler 200. In certain examples, a user operating the recycler 200 may be required to provide valid authentication credentials before performing any transaction on the recycler 200. As mentioned above, users in some scenarios may have direct physical access to the currency recycler 200, for example, by interacting directly with the display screen 213, various input devices 254, printer 256, etc. In other scenarios, users may access the recycler 200 to perform transactions remotely, for example, from a remote location (e.g., bank server 150 or a corporate office of the store) via one or more computer networks 120 and 140.

Figure 8C:
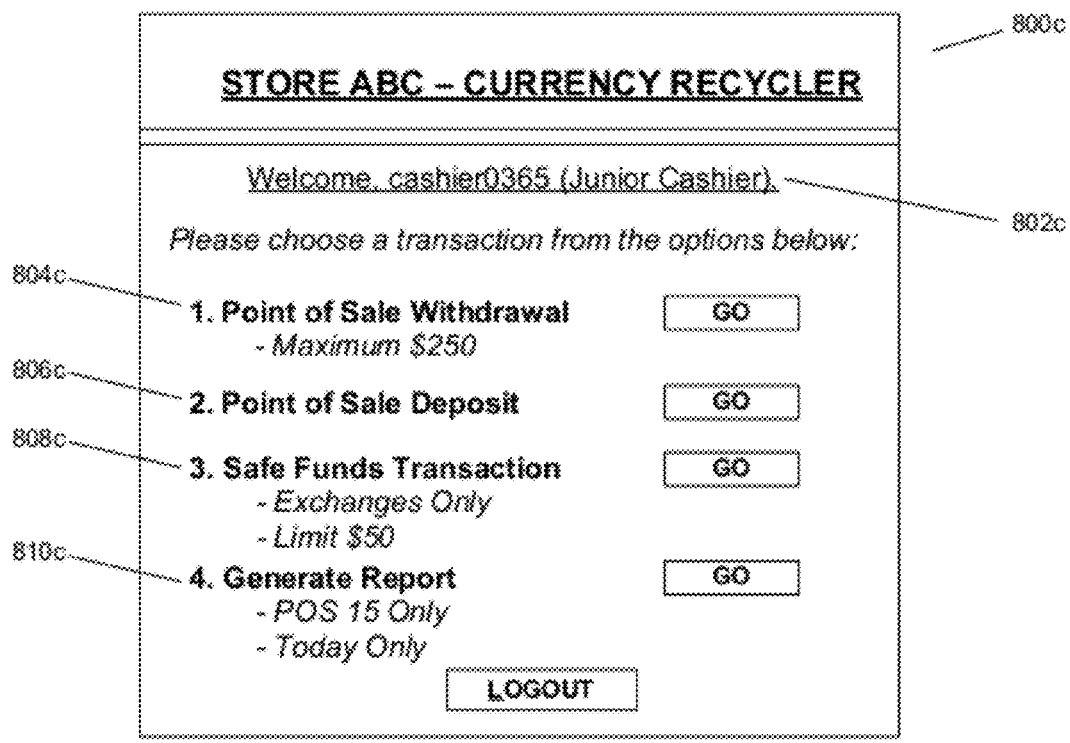

Whether supporting either local and/or remote access, the currency recycler 200 may initially display an authentication user interface to identify the user that will be requesting the transaction. FIG. 8A is an illustrative diagram showing an example of an authentication user interface that may be displayed by a currency recycler 200 at a retail location (e.g., Store ABC). In FIG. 8A, the user interface screen 800a includes text boxes to allow the user to enter login information 802a and password information 804a. After this information is submitted, the currency recycler 200 may access a user authentication database, for example, within the memory 203 of the recycler 200, to verify the user credentials and authenticate the user as a valid user of the currency recycler 200. In this example, if the user is not a valid recycler user, they may be denied any further access and an error or other notification may be generated by the recycler 200.

Continuing with step 701, if the user/operator is authenticated as a valid user, then the recycler 200 may update the user interface to allow the user to enter a transaction request. For example, in FIG. 8B, the user interface screen 800b indicates that the user (e.g., cashier 0365) is authorized to access the recycler 200. The user interface 800b also presents the user with an illustrative menu of the types of transactions (802b-810b) supported by the recycler 200. From this screen 802b, the user may enter the desired transaction request into the recycler 200, for example, by selecting a type of transaction (802b-810b), inputting the required information, and selecting the corresponding 'GO' button. Although the sample user interface 800b shows a single screen for receiving all of this information, in other examples, multiple input screens, sub-menus, and other well known user interface techniques may be provided by the recycler user interface in order to receive the transaction request from the user. Additionally, in this example, the list of transactions (802b-810b) may be presented without regard to threshold information, for instance, if this data has not yet been retrieved. However, in other examples, threshold information may be retrieved soon after a user has been authenticated, so that the transaction user interface may be customized based on this information (e.g., see FIG. 8C).

In this example, after the user has entered the requested transaction data into the user interface 800b in step 701, the recycler 200 may then identify the user and any associated user roles in step 702. Then in step 703-704, the recycler 200 may retrieve the user thresholds and user role thresholds corresponding to the user and his/her user roles. These steps may comprise database queries and other similar data retrieval techniques as discussed above in relation to FIGS. 5-6. For example, step 702 may comprise querying the Users table 600b with the user ID received from the user authentication process, in order to retrieve the list of user roles associated with the authenticated user. Then, in step 703, the Roles-Thresholds table 600a may be queried to retrieve the designated thresholds each of the user's roles. In step 704, any individual user thresholds stored on the recycler 200 for this user may be retrieved, for example, by querying the Users-Thresholds table 600c. Thus, in these examples, steps 702-704 comprise relatively simple queries based on the sample tables 600a-600c. However, in other examples, the database structure and corresponding queries may be more complex, involving multiple related tables and/or multiple data sources. Additionally, in certain examples, steps 702-704 need not be performed in the same order shown in FIG. 7. In general, retrieving individual user thresholds in step 704 may be performed anytime after the user requesting the transaction has been identified, and retrieving user role thresholds in step 703 may be performed anytime after the user roles associated with the user have been identified. Additionally, in certain examples, the user might not be associated with any user roles. Furthermore, in some examples, the user and/or one or more of the user roles might not be associated with any thresholds. Thus, the results of any of the steps 702, 703, and step 704 may potentially be empty in certain examples.

According to another aspect, certain user roles may have related parent roles or child roles (sub-roles) defined at the recycler 200. That is, in some examples, a user role may inherit thresholds and threshold values from another user role. For instance, a recycler 200 may have parent role named Managers, and three child roles (or sub-roles) named 'Day Managers', 'Night Managers', and 'General Managers'. Thus, while each sub-role may have a district set of thresholds defined, certain other thresholds that are common to all of the store managers may be associated with the Managers role and may therefore automatically be inherited by all of the sub-roles beneath the Managers role. Therefore, in certain examples, the recycler 200 may be configured to query a Related Roles table (not shown) to identify any parent roles corresponding to the selected user's roles, and then may query a Roles-Thresholds table to retrieve the parent role thresholds as well as the child role thresholds.

As described above, a user may have user role thresholds which are potentially in conflict with its own individual user thresholds. For instance, the Cashiers role on a recycler 200 may have a transaction withdrawal limit of $200, but a specific user who is a member of the Cashiers role may have a different transaction withdrawal limit of $300. Similarly, a user role may have thresholds that are potentially in conflict in the thresholds of related parent roles and/or child roles. Thus, in the above example, the Cashiers role has a transaction withdrawal limit of $200, but a child role within the Cashiers role (e.g., Junior Cashiers) may have a lower withdrawal limit of $100, and another child role (e.g., Senior Cashiers) may have higher withdrawal limit of $250. In certain systems, these conflicts may be undesirable and may be prohibited by the recycler 200. For example, a database rule may prevent the creation of an individual user threshold that conflicts with any of that user's role thresholds, and other rule may prevent any sub-role thresholds from conflicting with the thresholds of the parent role. However, in other systems, these threshold conflicts may be preferable for enhanced customization of the privileges and limitations of users and user roles. For systems in which thresholds may potentially conflict, like the examples described above, rules may be created so the recycler 200 may determine which threshold to apply when processing the user transaction. For example, as described above, the recycler 200 may treat individual user thresholds as superior to corresponding user role thresholds, meaning that a user threshold would essentially override any conflicting role thresholds stored on the system. Similarly, the recycler 200 may treat thresholds of sub-roles as superior to thresholds of parent roles. Thus, applying this rule to the above example, any user in the Junior Cashiers role would have a withdrawal limit of $100, any user in the Senior Cashiers role would have a withdrawal limit of $250, and any user in the Cashiers role (but not in either sub-role) would have the standard withdrawal limit of $200. In this example, Junior Cashiers and Senior Cashiers would also inherit the other threshold limitations of the Cashiers role, unless they were in conflict with any other sub-role thresholds. As yet another example, it may be possible for a user to be a member of two non-related roles having conflicting thresholds. For instance, the Contractor XYZ user in the Users table 600b is a member of the Junior Cashiers role and the custom Drivers role, which may have one or more different threshold values (e.g., withdrawal limits, transaction type restrictions, time restrictions, etc.). In this example, the recycler may apply other rules may to resolve the threshold conflicts, such as deferring to non-custom roles over customer roles (or vice versa), relying on the time that the user-role association was created, or allowing users to designate one of their user roles as a primary role which will be treated as superior to other roles when threshold conflicts occur.

As described above, in certain examples, the recycler 200 may authenticate the user and retrieve the information corresponding to the requested transaction before determining the applicable user thresholds. However, in other examples, user thresholds and/or user role thresholds may be determined anytime after the user has been identified, and a customized transaction request user interface may be generated based on the determined thresholds. For example, the customized user interface 800c of FIG. 8C performs a similar function as the transaction request interface 800b shown in FIG. 8C. However, the example user interface 800c includes customized components to advise the user of their functional limitations on the recycler 200 and/or to prevent the user from attempting to perform an unauthorized transaction. In this example, the user's role (Junior Cashier) is identified on the user interface 800c at 802c, and the menu of transactions available to the user 804c-810c has been generated based on the determination of thresholds applicable to that user. For example, the user interface 800c might not even display transaction types beyond the user's level of authority (e.g., recycler administrative functions), or might show those functions as only non-active interface components. Additionally, for the transactions 804c-810c that the user is permitted to perform on the recycler 200, the interface 800c may be customized to advise (or enforce) the threshold limitations (e.g., displaying amount limits, time windows, specific points of sales, etc.), as shown in this example. In other examples, the user interface components may be configured to prevent the user from exceeding any threshold limitation, for example, by imposing a maximum value on a text box control, or displaying a slide bar with lower-upper ranges corresponding to the user's thresholds.

After the determination of the user role thresholds and/or individual user thresholds that should be applied to the requested transaction, the transaction entered by the user may then be processed in step 705. In this step, one or more comparisons are performed to determine if the requested transaction is in accordance with the recycler limitations/privileges defined in the thresholds identified in steps 703-704. For instance, if the user if the has requested a point of sale withdrawal of $400 via item 802b in user interface 800b, but it has been determined in steps 703-704 that the user is only permitted to make point of sale withdraws up to $200, then the transaction will not be processed (705:No). Then, in step 707, the user may be notified of the transaction failure via the user interface 800b and/or the recycler 200 may complete one or more additional error handling procedures (e.g., notifications to administrators, error log reporting, restrictions of further user access, etc.) in response to the failed transaction attempt. However, if there are no applicable thresholds on the user, or the user's transaction request is within the recycler limitations of the defined user and user role thresholds (705:Yes), then the transaction may be processed as normal by the recycler 200.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements of the other embodiments. Additionally, for example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present invention. The description is thus to be regarded as illustrative instead of restrictive on the present invention.

We claim:

1. A method comprising:
   receiving at a currency handling device user input corresponding to an identification of a first user role;

receiving at the currency handling device user input identifying one or more users associated with the first user role;

receiving at the currency handling device user input defining a first user role threshold associated with the first user role, wherein the first user role threshold comprises a first time threshold corresponding to a time window during which an operation of the currency handling device will be limited for the one or more users associated with the first user role;

configuring the currency handling device such that the first user role threshold will apply to subsequent transactions performed by the one or more users associated with the first user role, and such that the first user role threshold will not apply to subsequent transactions performed by users not associated with the first user role;

after configuring the currency handling device, receiving user input adding a new user at the currency handling device, said user input identifying the new user as a member of the first user role; and automatically reconfiguring the currency handling device such that the first user role threshold will apply to subsequent transactions performed by the new user.

2. The method of claim 1, wherein the currency handling device services a retail establishment and wherein the first user role corresponds to one of a cashiers role, a store managers role, or a device administrators role.

3. The method of claim 1, wherein the first user role threshold is a compound threshold comprising the first time threshold and a second currency threshold corresponding to at least one of a currency withdrawal limit or a replenishment limit for the time window of the first time threshold.

4. The method of claim 1, wherein the time window of the first time threshold corresponds to at least one of:
a time window during which users within the first user role are permitted to use the currency handling device;
a time window during which users within the first user role are not permitted to use the currency handling device;
a time window during which users within the first user role are permitted to withdraw currency from the currency handling device; or
a time window during which users within the first user role are not permitted to withdraw currency from the currency handling device.

5. The method of claim 1, further comprising:
after configuring the currency handling device, receiving at the currency handling device user input defining a custom user threshold for a first user within the one or more users associated with the first user role, wherein the custom user threshold is different from and in conflict with the first user role threshold; and
reconfiguring the currency handling device such that the custom user threshold will apply and the first user role threshold will not apply to subsequent transactions performed by the first user.

6. The method of claim 1, wherein the first user role corresponds to a sub-role of a parent role stored at the currency handling device, and wherein configuring the currency handling device comprises applying a plurality of user role thresholds associated with the parent role to the sub-role.

7. The method of claim 1, wherein the first user role threshold is a compound threshold corresponding to a specific transaction type, a specific currency amount, and the time window of the first time threshold.

8. A currency handling device comprising:
a processor; and
memory storing computer readable instructions that, when executed, cause the currency handling device to perform a method comprising:
receiving user input corresponding to an identification of a first user role;
receiving user input identifying one or more users associated with the first user role;
receiving user input defining a first user role threshold associated with the first user role, wherein the first user role threshold comprises a first time threshold corresponding to a time window during which an operation of the currency handling device will be limited for the one or more users associated with the first user role;
configuring the currency handling device such that the first user role threshold will apply to subsequent transactions performed by the one or more users associated with the first user role, and such that the first user role threshold will not apply to subsequent transactions performed by users not associated with the first user role;
after configuring the currency handling device, receiving user input indicating that a new user should be added to the currency handling device and designating the new as a member of the first user role; and
automatically reconfiguring the currency handling device such that the first user role threshold will apply to subsequent transactions performed by the new user.

9. The currency handling device of claim 8, the method further comprising:
after configuring the currency handling device, receiving user input defining a custom user threshold for a first user within the one or more users associated with the first user role, wherein the custom user threshold is different from and in conflict with the first user role threshold; and
reconfiguring the currency handling device such that the custom user threshold will apply and the first user role threshold will not apply to subsequent transactions performed by the first user.

10. The currency handling device of claim 8, wherein the first user role corresponds to a sub-role of a parent role stored at the currency handling device, and wherein configuring the currency handling device comprises applying a plurality of user role thresholds associated with the parent role to the sub-role.

11. The currency handling device of claim 8, wherein the first user role threshold is a compound threshold corresponding to a specific transaction type, a specific currency amount, and the time window of the first time threshold.

12. One or more non-transitory computer readable media storing computer readable instructions that, when executed by a processor, cause the processor to perform a method comprising:
receiving at a currency handling device user input corresponding to an identification of a first user role;
receiving at the currency handling device user input identifying one or more users associated with the first user role;
receiving at the currency handling device user input defining a first user role threshold associated with the first user role, wherein the first user role threshold comprises a first time threshold corresponding to a time window during which an operation of the currency handling device will be limited for the one or more users associated with the first user role;
configuring the currency handling device such that the first user role threshold will apply to subsequent transactions performed by the one or more users associated with the first user role, and such that the first user role threshold will not apply to subsequent transactions performed by users not associated with the first user role;

after configuring the currency handling device, receiving user input indicating that a new user should be added to the currency handling device and designating the new as a member of the first user role; and automatically reconfiguring the currency handling device such that the first user role threshold will apply to subsequent transactions performed by the new user.

13. The one or more non-transitory computer readable media of claim 12, the method further comprising:

after configuring the currency handling device, receiving user input defining a custom user threshold for a first user within the one or more users associated with the first user role, wherein the custom user threshold is different from and in conflict with the first user role threshold; and reconfiguring the currency handling device such that the custom user threshold will apply and the first user role threshold will not apply to subsequent transactions performed by the first user.

14. A method comprising:

receiving at a currency handling device a first transaction request comprising a first user identifier associated with a first user of the currency handling device;

querying a database to identify a first user role associated with the first user;

identifying one or more first user role thresholds associated with the first user role, each first user role threshold corresponding to a functional limitation on the operation of currency handling device;

generating at the currency handling device a customized transaction request user interface based on the functional limitations of the first user role thresholds associated with the first user role;

receiving user input via the customized transaction request user interface comprising one or more transaction parameters within the functional limitations of the first user role thresholds associated with the first user role; and processing the first transaction request at the currency handling device.

15. The method of claim 14, wherein the currency handling device services a retail establishment and wherein the first user role corresponds to one of a cashiers role, a store managers role, or a device administrators role.

16. The method of claim 14, wherein processing the first transaction request comprises:

identifying one or more custom user thresholds, wherein at least one of the custom user thresholds corresponds to one of the first user role thresholds and has a different threshold value than its corresponding first user role threshold, wherein generating the customized transaction request user interface comprises accessing one or more threshold conflict rules stored at the currency handling device.

17. The method of claim 16, wherein generating the customized transaction request user interface comprises:

accessing a first threshold conflict rule that selects custom user thresholds over user role thresholds; and generating the customized transaction request user interface in accordance with the one or more custom user thresholds and not in accordance with any conflicting first user role thresholds.

18. The method of claim 16, wherein generating the customized transaction request user interface comprises:

accessing a first threshold conflict rule that selects the most recently created threshold;

determining a creation time for a first custom user threshold;

determining a creation time for a first user role threshold corresponding to and conflicting with the first custom user threshold; and generating the customized transaction request user interface in accordance with the most recently created of the first custom user threshold and the first user role threshold.

19. The method of claim 14, wherein generating the customized transaction request user interface comprises not displaying certain types of transactions that are not permitted according to the one or more first user role thresholds associated with the first user role.

20. The method of claim 14, wherein generating the customized transaction request user interface comprises displaying lower or upper currency limitations for certain types of transactions according to the one or more first user role thresholds associated with the first user role.

21. The method of claim 14, wherein at least one of the one or more first user role thresholds comprises a compound threshold corresponding to a specific transaction type, a specific currency amount, and a specific time window.

22. A currency handling device comprising:

a processor; and memory storing computer readable instructions that, when executed, cause the currency handling device to perform a method comprising:

receiving a first transaction request comprising a first user identifier associated with a first user of the currency handling device;

querying a database to identify a first user role associated with the first user;

identifying one or more first user role thresholds associated with the first user role, each first user role threshold corresponding to a functional limitation on the operation of currency handling device;

generating a customized transaction request user interface based on the functional limitations of the first user role thresholds associated with the first user role;

receiving user input via the customized transaction request user interface comprising one or more transaction parameters within the functional limitations of the first user role thresholds associated with the first user role; and processing the first transaction request at the currency handling device.

23. The currency handling device of claim 22, wherein processing the first transaction request comprises:

identifying one or more custom user thresholds, wherein at least one of the custom user thresholds corresponds to one of the first user role thresholds and has a different threshold value than its corresponding first user role threshold, wherein generating the customized transaction request user interface comprises accessing one or more threshold conflict rules stored at the currency handling device.

24. One or more non-transitory computer readable media storing computer readable instructions that, when executed by a processor, cause the processor to perform a method comprising:

receiving at a currency handling device a first transaction request comprising a first user identifier associated with a first user of the currency handling device;

querying a database to identify a first user role associated with the first user;

identifying one or more first user role thresholds associated with the first user role, each first user role threshold corresponding to a functional limitation on the operation of currency handling device;

generating at the currency handling device a customized transaction request user interface based on the functional limitations of the first user role thresholds associated with the first user role;

receiving user input via the customized transaction request user interface comprising one or more transaction parameters within the functional limitations of the first user role thresholds associated with the first user role; and processing the first transaction request at the currency handling device.

25. The one or more non-transitory computer readable media of claim 24, wherein processing the first transaction request comprises:

identifying one or more custom user thresholds, wherein at least one of the custom user thresholds corresponds to one of the first user role thresholds and has a different threshold value than its corresponding first user role threshold, wherein generating the customized transaction request user interface comprises accessing one or more threshold conflict rules stored at the currency handling device.

* * * * *